(No Model.) 5 Sheets—Sheet 3.

J. Q. A. HOUGHTON.
BUTTONHOLE STITCHING MACHINE.

No. 591,133. Patented Oct. 5, 1897.

Witnesses
Jos. S. Latimer
Theodore T. Snell

Inventor
John Q. A. Houghton
by Whitmer Brown
his Attorney

(No Model.)

J. Q. A. HOUGHTON.
BUTTONHOLE STITCHING MACHINE.

No. 591,133. Patented Oct. 5, 1897.

Witnesses
Jos. S. Latimer
Theodore T. Snell

Inventor
John Q. A. Houghton
by Arthur L. Browne
his Attorney (No Model.)

J. Q. A. HOUGHTON.
BUTTONHOLE STITCHING MACHINE.

No. 591,133. Patented Oct. 5, 1897.

Witnesses
Jos. S. Latimer
Theodore T. Snell

Inventor
John Q. A. Houghton
by Arthur F. Brown
his Attorney

UNITED STATES PATENT OFFICE.

JOHN Q. A. HOUGHTON, OF BALTIMORE, MARYLAND, ASSIGNOR, BY MESNE ASSIGNMENTS, TO DAVID H. FLACK AND GEORGE C. MORRISON, OF SAME PLACE.

BUTTONHOLE-STITCHING MACHINE.

SPECIFICATION forming part of Letters Patent No. 591,133, dated October 5, 1897.

Application filed July 25, 1895. Serial No. 557,106. (No model.)

*To all whom it may concern:*

Be it known that I, JOHN Q. A. HOUGHTON, of the city of Baltimore, in the State of Maryland, have invented certain new and useful Improvements in Buttonhole-Stitching Machines, of which the following is a specification.

The present invention consists in certain improvements upon the buttonhole-stitching machine set forth in Letters Patent of the United States No. 438,812, granted to me October 21, 1890. Said patented machine stitched, barred, stayed, and finished a buttonhole by a single continuous stitching operation, during which stitching operation the buttonhole-material holder carrying the goods was fed in a straight line while one straight side of the buttonhole was being stitched, was then turned step by step, comparatively slowly, while the eye of the buttonhole was being stitched, was then fed in a straight line while the second straight side of the buttonhole was being stitched, and was then caused to make a single quick turn through an arc of approximately ninety degrees, so as to present the buttonhole-slit sidewise instead of endwise of the line of the feed, whereby by the further continuance of the stitching a bar was formed across the end of the buttonhole composed of exactly the same kind of stitches as the rest of the buttonhole-stitches. Certain features of said patent consisted in the novel construction of the buttonhole-material holder and carrier in two parts, one of which was capable of turning upon the other, so that the quick quarter-turn could be made preparatory to stitching the bar, and in the mechanism for automatically effecting the said quick quarter-turn after the stitching of the second straight side of the buttonhole had been completed.

Now the present improvements do not alter the general mode of operation of the machine, since the present improved machine makes the same buttonhole, stitched, barred, stayed, and finished in a single continuous uninterrupted and wholly automatic operation as before.

The present improvements consist, first, in an improved and simplified construction of the mechanism for automatically turning the material-holder upon the carrier preparatory to forming the bar, a principal improvement consisting in an organization whereby the said mechanism is located below the bed-plate of the machine instead of above it, as in said patent; second, in the improved construction of the material holder and carrier adapting it to operate in conjunction with the improved turning mechanism; third, in improved means for operating the cloth-clamping jaws, and, fourth, in features in detail which will hereinafter be more particularly set forth.

The improvements are illustrated in the accompanying drawings, wherein—

Figs. 1 and 2 are drawn to a standard scale, as indicated. Figs. 3 to 20, inclusive, are drawn to a scale double the standard scale.

Figure 1:
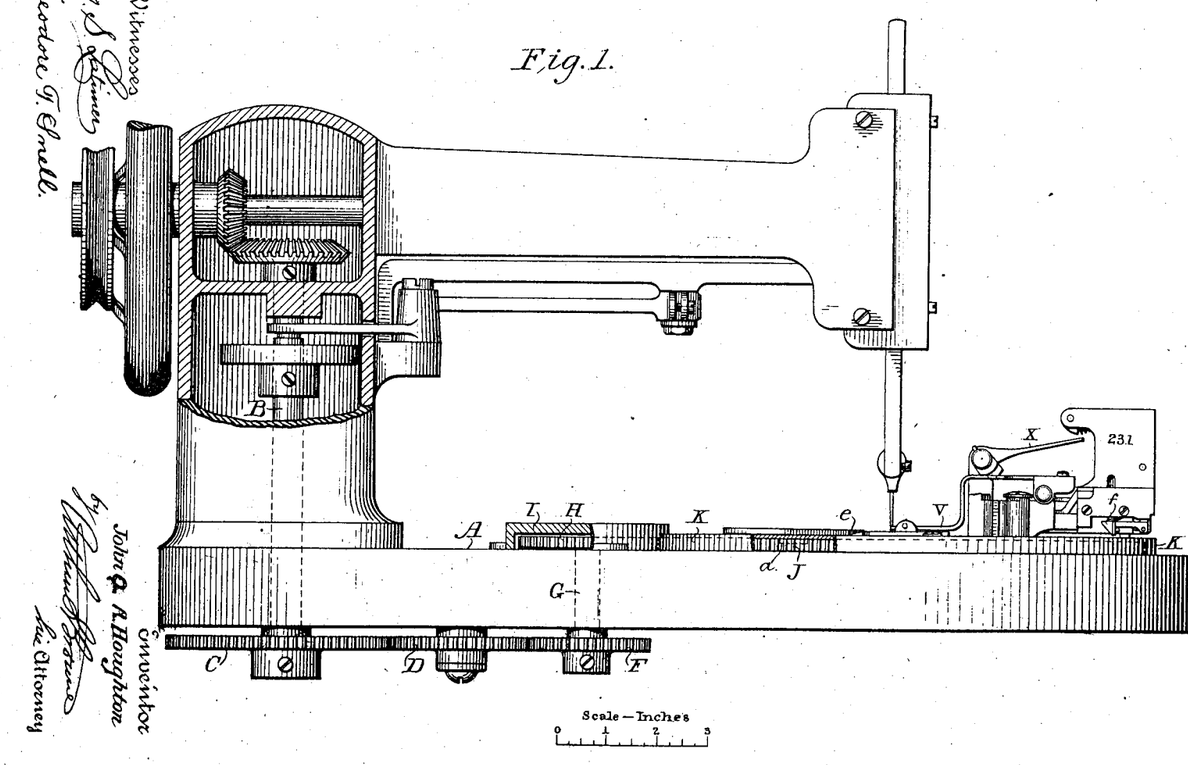
Figure 1 is a side view, partly in vertical section, of a buttonhole-stitching machine equipped with the present improvements.
Figure 2:
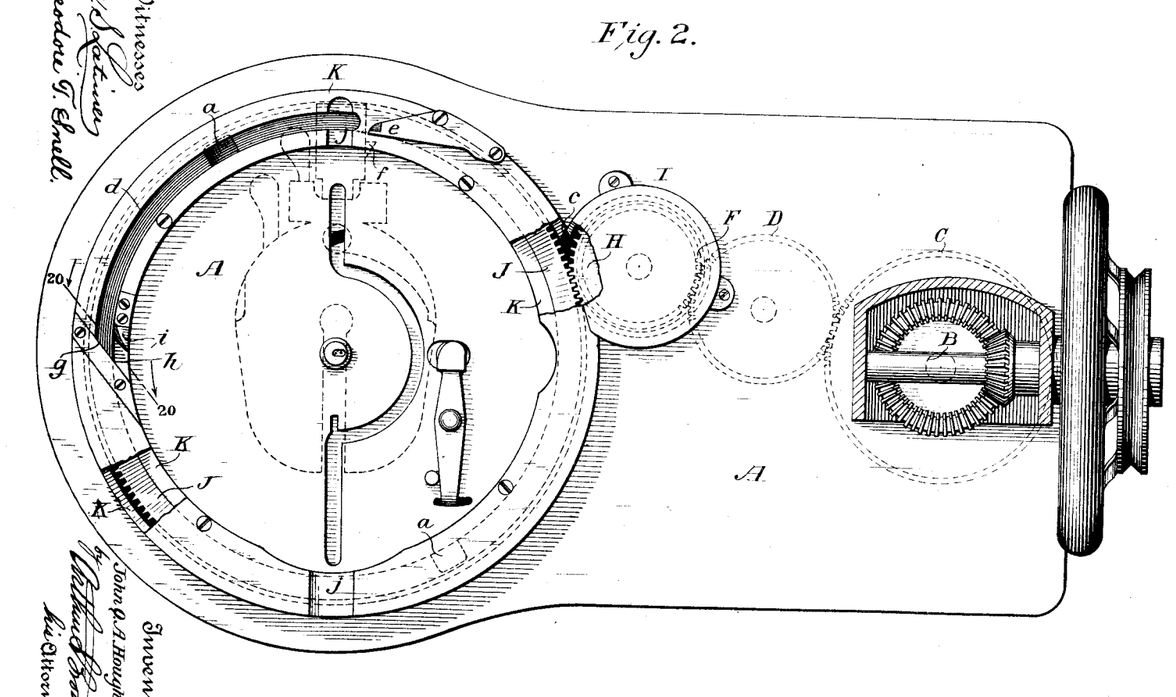
Fig. 2 is a plan view of the machine, the vertical shaft standard or housing being shown in horizontal section and the overhanging needle-arm being removed.

A is the bed-plate of the machine, and B the vertical driving-shaft. Secured to the vertical shaft B is a gear C, which meshes with an idler-gear D, which in turn meshes with a gear F on the lower end of a shaft G, which passes up through the bed-plate and carries at its upper end a gear H, covered by a cap I, said gear H meshing with a circular rack J above the bed-plate, which is covered by and turns within a casing K. These eight parts C D F G H I J K constitute all of the barring-operating mechanism and can be applied directly to existing machines which stitch ordinary unbarred eyed buttonholes. This barring-gearing is located mainly beneath the bed-plate, and the gears H and J, which are above the bed-plate, lie flatly thereupon, so as to take little vertical room, and they are covered so that they are not at all in the way. The gears are so proportioned with reference to the drive-shaft that the circular rack is constantly driven at the proper speed to effect the movement of the material-holder upon the material-carrier preparatory to stitching the bar. On its upper face the circular rack has two notches or recesses $a\ a$, with one of which a stud $b$ on the material-holder engages at the proper instant, so that during the engagement between said stud and one of the recesses the material-holder is turned a quarter of a revolution upon the material-carrier, thereby presenting the material in proper position for the barring. As soon as this quarter-revolution is completed the stud $b$ is automatically disengaged from the recess $a$, so that the further travel of the material-holder with the rack ceases.

The rack-casing K entirely incloses the circular rack J, except that it has a recess $c$ at one side, through which the gear H intermeshes with the rack, and it has a quadrantal opening $d$ on its top, through which the stud $b$ engages with recess $a$ and travels during its quadrantal excursion. In addition to these openings the rack-casing has a fixed abutment $e$, which acts upon a trip $f$ on the material-holder, as hereinafter more fully set forth, to lower the stud into engagement with recess $a$; a disengaging-cam $g$, which automatically disengages the stud $b$ from recess $a$; a notch $h$, in which the stud $b$ enters after being disengaged from the recess; a restoring-cam $i$, which elevates the stud $b$ to its usual inactive position, and depressions $j\ j$ for the stud $b$ to travel in at the opposite ends of the reciprocation of the material holder and carrier.

As in said patent, the material holder and carrier is in two parts, L being the material-carrier and M the material-holder, turning thereupon. The carrier is equipped with the spring-depressed guide-pin N, having a manipulating flanged head $l$, substantially as in said patent, said pin engaging the usual feed cam-groove in the ordinary manner, and said carrier also has the slot $m$, with which the usual plate-button engages and for the passage of the needle, as clearly shown in said patent. There is, however, an improved and simplified connection between the carrier L and holder M. A circular plate O, having open guide-slot $n$ for the plate-button and needle, is held and turns in suitable overhanging ways $o$ on a plate P, secured to the carrier. This plate P has flanges $p\ p$, extending beneath overhanging shoulders $q\ q$ on the carrier, and screws $r\ r$ in the plate P, entering rows of threaded apertures $s\ s$ in the carrier and permitting the adjustment of the plate P on the carrier, thereby determining the length of the buttonhole. The plate O carries on its upper face projecting straight ribs Q Q, which enter slots $t\ t$ in the holder M. Screws $u\ u$ secure the holder to the plate O and admit of the longitudinal adjustment of the holder on the ribs Q Q when the length of the buttonhole is changed. The holder has a slot $v$ for the needle and serrated plates $w\ w$, constituting the lower clamp-jaws for the goods.

Figures 3, 4:
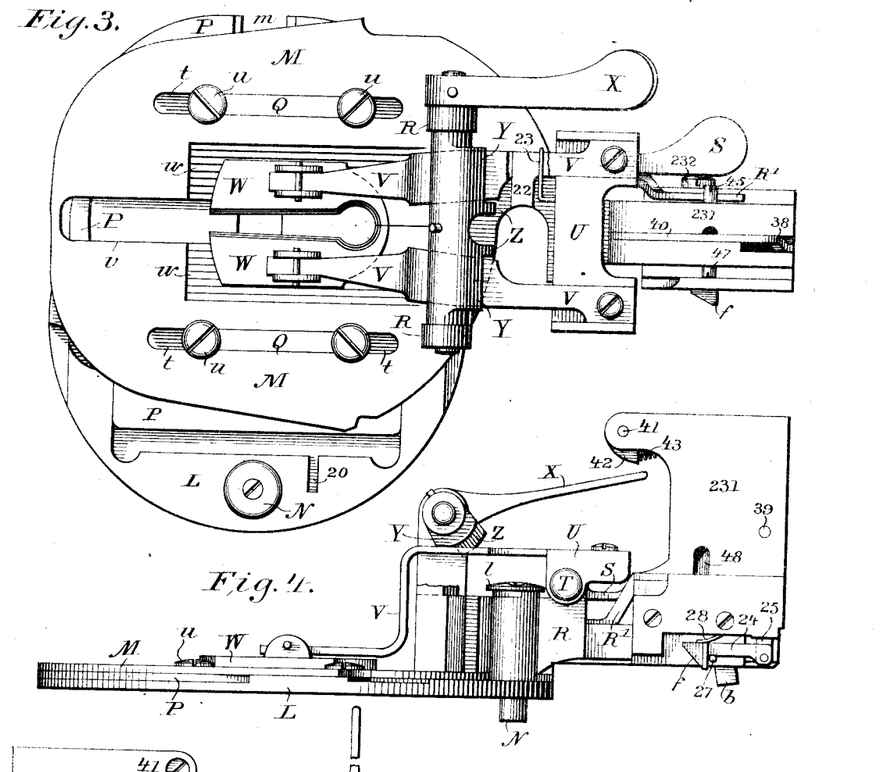
Fig. 3 is a plan view of the material holder and carrier.
Figs. 4 and 5 are views of the opposite sides of the material holder and carrier.
Figure 5:
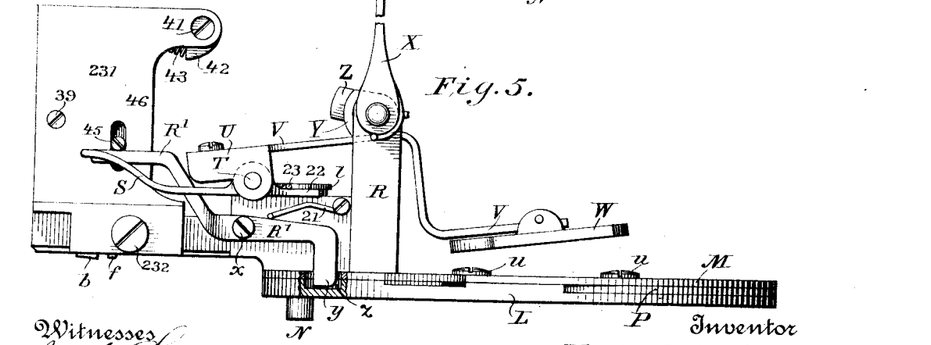
Figure 7:
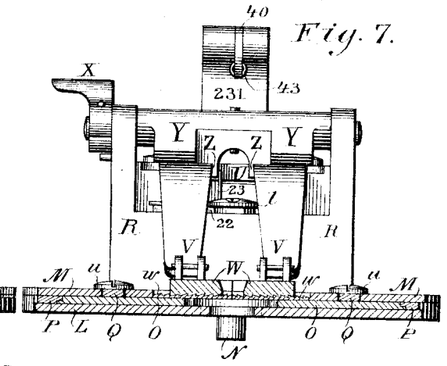
Fig. 7 is a vertical cross-section of the material holder and carrier, looking toward the clamp-operating mechanism.
Figure 8:
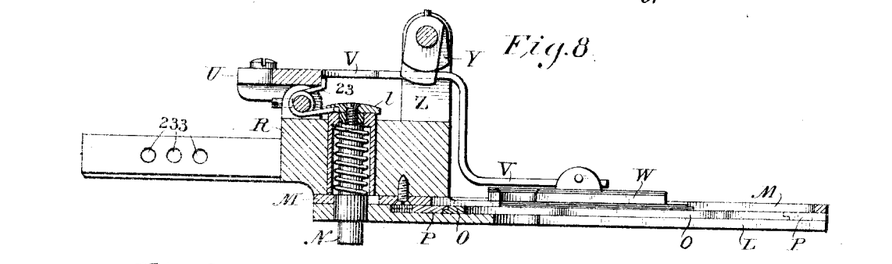
Fig. 8 is a central longitudinal section of the material holder and carrier, the housing 231 being removed.
Figure 9:
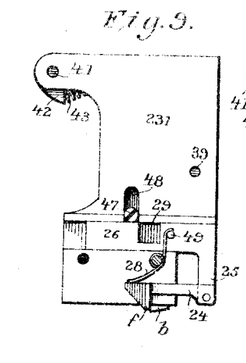
Fig. 9 is a side view of the housing 231.
Figure 10:
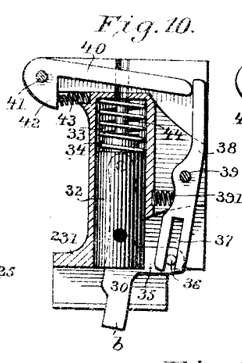
Fig. 10 is a central longitudinal vertical section, partly in elevation, of the said housing.
Figure 11:
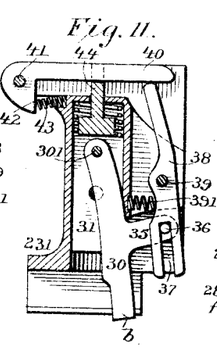
Fig. 11 is a central longitudinal vertical section of the said housing.
Figure 12:
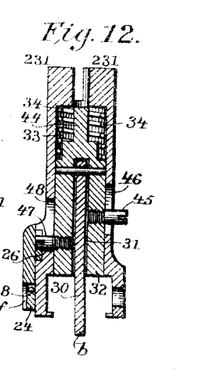
Fig. 12 is a vertical cross-section of said housing.
Figure 13:
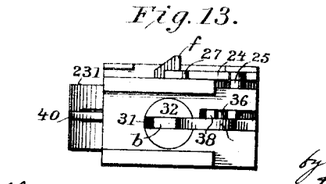
Fig. 13 is a plan view of said housing.
Figure 14:
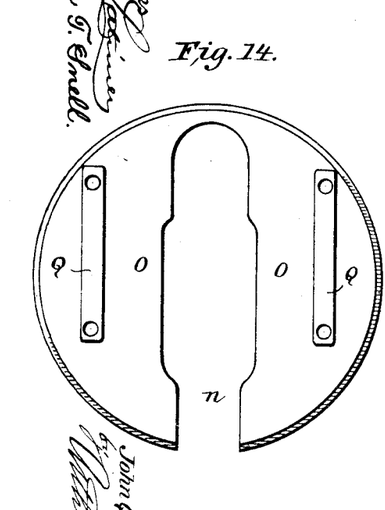
Fig. 14 is a plan view of the rotary plate which carries the material-holder.
Figure 15:
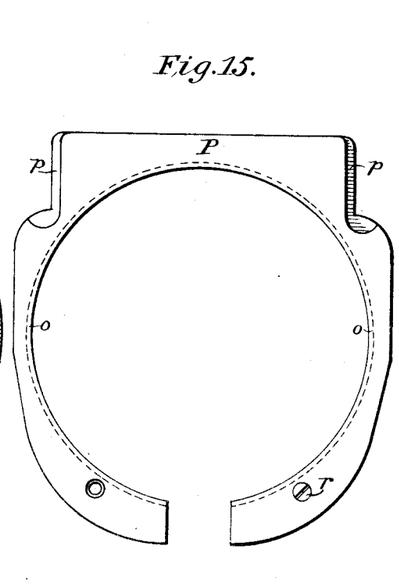
Fig. 15 is a plan view of the guide-plate for said rotary plate.
Figure 16:
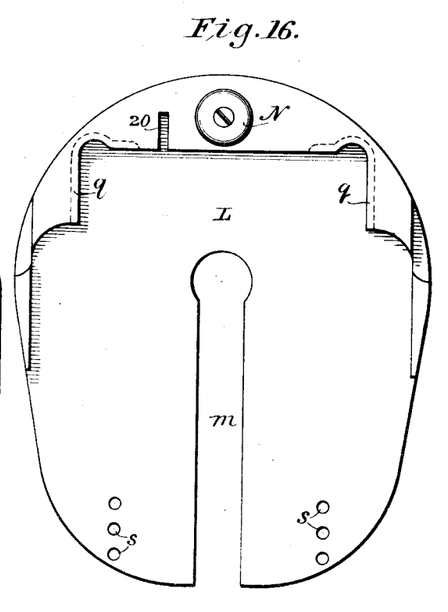
Fig. 16 is a plan view of the material-carrier.
Figure 17:
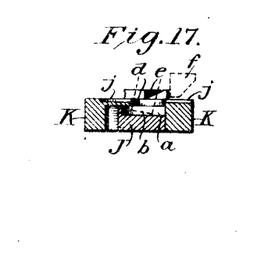
Figs. 17, 18, 19, and 20 are detail views of the rotary rack and the annular casing, Fig. 20 being a cross-section in a plane indicated by the line 20 20 in Fig. 2.
Figure 18:
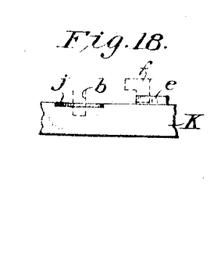
Figure 19:
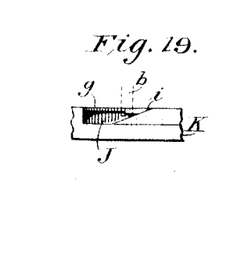
Figure 20:
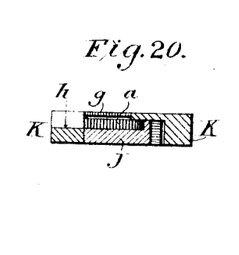

Mounted on the holder M is a bracket R, which carries all the other operative parts. Pivoted to it at $x$ is a locking-lever R', the lock $y$ of which extends through a slot $z$ in the holder and engages a notch 20 in the carrier to lock the holder and carrier together. A spring 21 keeps the lock normally engaged with the notch 20.

A hand-lever S, pivoted on a shaft T on the bracket R, has a lifter 22, which is located beneath the head $l$ of guide-pin N when the material carrier and holder are locked together. By lifting the lifter 22 against the tension-spring 23 the guide-pin N is freed from engagement with the feed cam-groove, thereby permitting the material holder and carrier to be moved by hand to their initial or starting position after the completion of a buttonhole.

Figure 6:
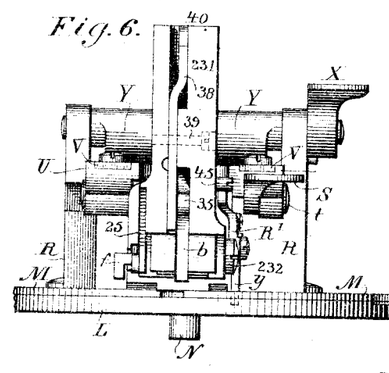
Fig. 6 is a rear end view of the material holder and carrier.

Turning on the shaft T is the clamp-hinge U, to which are fastened the elastic arms V V, carrying the upper clamping-jaws W W. The said jaws are held uplifted by the spring 23 bearing against the clamp-hinge. The jaws W W are depressed to clamp the goods and are separated to spread the buttonhole by a single continuous movement of the hand-lever X. Said lever is secured to a cross-shaft on the bracket R, which has depressing-cams Y Y, which act upon the jaw-arms V V to clamp the goods, and a spreading cam or cams Z, which immediately thereafter enter between the arms V V and spread them apart, the elasticity thereof permitting. The cams Z may carry the cam-faces, or the adjacent faces of the arms V V may be inclined, as shown. I am thus enabled to accomplish by one lever what required two separate levers in my aforesaid patent. The bracket carries at its rear end a housing 231. The housing is adjustable along the bracket R by means of a screw 232, which coöperates with a series of threaded holes 233 in the bracket in order to allow for the stitching of buttonholes of different lengths.

The trip $f$ is carried at one end of an arm 24, which is pivoted to the depending leg 25 of a slide 26, which slides back and forth in suitable ways formed in the housing 231. The trip-arm 24 is normally held down upon a fixed stud 27 by a spring 28. The slide 26 has a recess or notch 29, the purpose of which will presently appear.

The stud $b$ is the lower end of a stud-arm 30, which is pivoted at 301 at its upper end within a slot 31 in a cylindrical plunger 32, which slides vertically within a tubular chamber 33 in the housing 231. A coiled spring 34 normally presses said plunger 32 and stud downwardly. The stud-arm 30 has a laterally-projecting member 35, having a projecting pin 36, which enters a slot 37 in a lever 38, pivoted at 39 within the housing 231. The slotted lower end of said lever 38 is normally held outward by a coiled spring 391. Coöperating with the upper free end of the lever 38 is a latch 40, pivoted near one end at 41 within the housing 231 and having a shoulder 42, against which bears a spring 43, tending normally to depress the free end of the latch which coöperates with the upper end of the lever 38. The said latch is elevated against the tension of spring 43 by a pin 44 on the upper end of the plunger 32. Projecting from one side of the plunger 32 is a pin 45, which extends through a slot 46 in one wall of the housing 231 and above the free end of the locking-lever R'. Projecting from the other side of the plunger 32 is a second pin 47, which extends outwardly through a slot 48 in the other wall of the housing and either rides on the top of the slide 26 or drops into the notch 29 thereof, depending upon the position of said slide. Said pin 47 normally rests upon the top of said slide, said slide being normally held in proper normal position relatively to said pin 47 by the spring 28, which bears upon a stud 49 on said slide.

During the stitching of the two straight sides and the eye of the buttonhole the bar-actuating devices carried by the material-holder occupy their normal position—that is to say, the stud $b$ and its plunger 32 occupy their elevated position, the pin 47 resting upon the top of the slide 26, and the stud $b$ also occupies its outer position, being pressed out by the spring 391, the latch 40 then resting on top of the lever 38.

When now the second straight side of the buttonhole is just approaching completion, the material holder and carrier have been fed to such a position that the trip $f$ comes in contact with the fixed abutment $e$ on the rack-casing K. Then the further feed of the material holder and carrier causes the trip $f$ and its slide 26 to be moved inwardly, thus bringing the notch 29 thereof beneath the pin 47 on the plunger 32. The plunger being then no longer supported by the pin 47, resting on the top of slide 26, its spring 34 forces it downwardly, thus carrying down the pin 45, which comes in contact with the free end of locking-lever R', thus rocking the same, whereby its lock $y$ is raised out of the notch 20 in the carrier, thereby unlocking the carrier and holder and leaving the holder free to turn on the carrier. At the same time the downward movement of the plunger 32 depresses the stud $b$ downwardly until it rests upon the top of the rotating rack J. Consequently as soon as a recess $a$ on the rack J comes beneath the stud $b$ the spring 34 presses said stud into the recess, engaging the two together, and as the result the stud $b$ and the material-holder M swing around through a quadrant, the holder swinging upon the carrier L. As soon as the quadrant is completed the stud $b$ encounters the disengaging-cam $g$, which swings the stud $b$ inwardly upon its pivot 301, thus freeing said stud from the rotating rack J, and at the same time swinging the upper end of the lever 38 outwardly against the tension of the spring 391 until the upper end of said lever 38 is beyond the end of the latch 40, and thereupon the spring 43 lowers the free end of the latch 40 below the upper end of lever 38, thereby locking the stud $b$ in its inner position. This locking of the swinging stud is of importance, since otherwise during the subsequent feed of the material holder and carrier during the stitching of the bar the stud $b$ might swing outwardly through notch $h$ in the rack-casing K, and thereby be caught by the next recess $a$ of the rack, with resulting damage to the machine or marring of the stitching.

After the bar has been stitched the further feed of the material holder and carrier ceases and said holder and carrier must thereupon be returned to their initial or starting position. To effect this, the carrier is first swung back through the quadrant. During this movement the stud $b$ rides upwardly on the restoring-cam $i$ on the rack-casing. The upward movement of the stud $b$ elevates the plunger 32, thus lifting its pins 44, 45, and 47. Pin 44 comes in contact with latch-lever 40, elevating the same, thus freeing it from the lever 38, and thereupon the spring 391 swings the lever 38 outwardly, thus swinging outwardly the stud $b$ to its original and normal position. The elevation of pin 45 lifts also the locking-lever R' to move under the influence of its spring 21 to its position ready for locking. The elevation of pin 47 lifts it clear out of the notch 29 on the slide 26, and thereupon the slide is moved outward by its spring 28, so that its top is brought beneath the pin 47, which thereafter rests upon it when the material holder and carrier are moved clear from the rack-casing K. When the holder is swung entirely back throughout the quadrant, the lock $y$ of the locking-lever R' automatically engages the notch 20 in the carrier, thereby again locking the carrier and holder together. By then manipulating the lever S the guide-pin N is lifted free from the feed cam-groove and the holder and carrier are moved to their starting position in the usual manner.

To adjust for different lengths of buttonholes, the rotary plate P is first adjusted upon the carrier L. The holder M is then adjusted on the plate P, and finally the housing 231 is adjusted on the bracket R. The adjustment of the housing on the bracket determines the moment at which the stitching of the second straight side of the buttonhole terminates and at which the quadrantal turn is made preparatory to the stitching of the bar.

The speed of the rack is so timed relatively to the stitch-forming mechanism (by properly proportioning the gears, as shown) that one of the recesses $a$ will encounter stud $b$ and swing through the quadrant within the interval required for forming one stitch. The rack rotates once to two rotations of the shaft B and to four rotations of the main or needle shaft.

It will be noted that the entire traverse of the material holder and carrier is within the rack-casing, said casing being of a sufficient diameter for this purpose. The rack is concentric with the inthrow of the needle, so that the turn of the holder is properly effected. The stud $b$ and trip $f$, which coöperate with the rack to shift the holder on the carrier, are out of the way, so that they are not liable to be accidentally struck or to be encountered by the goods. Except during the formation of the bar the holder and carrier are securely locked together and can only be unlocked by the proper movement of the trip $f$. The trip and cams on the rack-casing need not be on the rack-casing, but on any fixed part of the machine which permits their proper relative location to the material holder and rack.

The parts called the "stud" $b$ and "trip" $f$ may be variously modified in construction as long as they perform the indicated functions, and hence in the subjoined claims, when said parts are referred to by name and letter, such references are to be considered as designations merely and not as limitations.

It will further be noted that the rack and its actuating mechanism, together with the rack-casing, its cams, and the coöperating parts on the holder, constitute means for shifting the holder upon its carrier.

I claim as my invention—

1. The material-carrier, and the material-holder turning thereupon, in combination with the rotary rack surrounding said carrier and holder and concentric with the axis upon which said holder turns, and means for coupling said holder and rack whereby said holder is turned on said carrier, substantially as set forth.

2. The material-carrier and the material-holder turning thereupon, in combination with the rotary annular rack operatively connected to the carrier, the drive-shaft, the gearing intermediate between the rack and shaft, and means for coupling and uncoupling said holder and rack, substantially as set forth.

3. The bed-plate, the rotary annular rack above the same, the rack-gear above the bed-plate engaging said rack, the drive-shaft, and intermediate gearing below the bed-plate connecting said rack-gear and drive-shaft, in combination with the material-carrier and the material-holder turning thereupon, said carrier being operatively connected to said rack and means for coupling said holder and rack, substantially as set forth.

4. The rotary rack driven from the same drive-shaft which actuates the stitch-forming mechanism at such a speed as to turn the material-holder upon the carrier through a quadrant within the time required for the formation of a single stitch, in combination with the material-carrier and the material-holder turning thereupon, and means for coupling said holder and rack, substantially as set forth.

5. The rotary annular rack, and the annular casing therefor, in combination with the material-carrier and the material-holder turning thereupon, and means for coupling said holder and rack, substantially as set forth.

6. The rotary rack provided with one or more recesses, in combination with the material-carrier and the material-holder turning thereupon, said holder having a stud adapted to engage with said recesses, substantially as set forth, whereby said holder is turned upon said carrier.

7. A stationary part of the machine such as the rack-casing, having a quadrantal opening therein, and a rotary part having a rack thereon and having one or more recesses therein, in combination with the material-carrier and the material-holder turning thereupon, said holder having a stud adapted to engage with said recesses through said quadrantal opening, substantially as set forth.

8. A stationary part of the machine, such as the rack-casing, having an abutment, and a rotary part having a rack thereon, in combination with the material-carrier and the material-holder turning thereupon, said material-holder having a normally upheld stud adapted to engage said rotary part, and a trip actuated by said abutment for releasing said stud, substantially as set forth.

9. A stationary part of the machine, such as the rack-casing, having a disengaging-cam, and the rotary part having a rack in combination with the material-carrier and the material-holder turning thereupon, said material-holder having a stud which engages with the rotary part, and which is disengaged thereupon by said cam, substantially as set forth.

10. The rotary part having a rack, the material-carrier, and the material-holder turning thereupon, said holder having a stud which engages said rotary part, in combination with a stationary part of the machine, such as the rack-casing, having a restoring-cam which restores said stud to its normal inactive position, substantially as set forth.

11. The material-carrier, and the holder turning thereupon, said holder having a vertically-moving stud $b$, in combination with the rotary part having a rack, said part adapted to be engaged by said stud, substantially as set forth.

12. The material-carrier, and the holder turning thereupon, said holder having a horizontally-moving stud $b$, in combination with the rotary part having a rack, said part adapted to be engaged by said stud, substantially as set forth.

13. The material-carrier, and the holder turning thereupon, said holder having a vertically-movable, and horizontally-swinging stud $b$, in combination with the rotary part having a rack, said part adapted to be engaged by said stud, substantially as set forth.

14. The material-carrier, and the holder turning thereupon, said holder having the stud $b$, having each of the following characteristics: first, it has a normal inactive outer elevated position, being maintained there by a suitable retaining device; second, it has an operative outer depressed position in engagement with the material-holder-shifting mechanism, into which position it is automatically brought by the movement of said retaining device; third, it has an inoperative inner depressed position in which it is locked by a suitable locking device; and fourth, it is restored to its normal position by being uplifted, whereby it is unlocked and automatically moved to its outer position, in combination with said material-holding-shifting mechanism, said retaining device, said locking device, and means for uplifting said stud, substantially as set forth.

15. The material-carrier, in combination with the material-holder turning thereupon, said holder having a spring-actuated vertically-sliding plunger, and the stud $b$, pivoted thereto and adapted to engage the rotary rack-bearing part, substantially as set forth.

16. The material-carrier, in combination with the material-holder turning thereupon, said holder having the stud $b$, and the trip-slide which upholds the same, said slide having a depressed portion which on the movement of the slide allows said stud to fall and engage the rotary rack-bearing part, substantially as set forth.

17. The material-carrier, in combination with the material-holder turning thereupon, means locking the carrier and holder against relative movement, said holder having the trip-slide, the trip $f$, carried thereby, operative mechanism between said locking means and the slide, and the spring for moving said slide in one direction to restore it to its normal direction, whereby the carrier and holder are unlocked when the slide is tripped, substantially as set forth.

18. The material-carrier, in combination with the material-holder turning thereupon and normally locked thereto, said holder having the trip-slide controlling the locking mechanism and the trip pivoted to the slide, substantially as set forth.

19. The material-carrier, in combination with the material-holder turning thereupon, said holder having stud $b$, holder-shifting mechanism with which said stud engages, the automatically-locking lock for locking the holder and carrier together, and means for unlocking the same when the stud $b$, engages with the holder-shifting mechanism, substantially as set forth.

20. The material-carrier, in combination with the material-holder turning thereupon, said holder having stud $b$, the latch for holding the stud $b$, in its inner position, and means for actuating said latch, and the rotary part adapted to be engaged by the stud, substantially as set forth.

21. The material-carrier, in combination with the material-holder turning thereupon, said holder having the stud $b$, and levers 38, and 40, in operative relation with said stud, and the rotary part adapted to be engaged by the stud, substantially as set forth.

22. The material-carrier, in combination with the material-holder turning thereupon, said holder having the stud $b$, slotted lever 38, spring therefor, the lever 40, spring therefor, and the plunger 32, in operative relation with said stud, and the rotary part adapted to be engaged by the stud, substantially as set forth.

23. The material-carrier, in combination with the material-holder turning thereupon, said holder having the bracket R, and the housing 231, adjustable thereupon, means locking the holder and carrier against relative movement, and mechanism within the housing controlling said locking means, substantially as set forth.

24. The rotary annular rack, in combination with the material holder and carrier which executes its operative movements within the inner periphery of said rack, substantially as set forth.

25. The stitch-forming mechanism, and the rotary rack having its center at the inthrow of the needle, in combination with the material-carrier, and the material-holder turning upon said carrier, substantially as set forth.

26. The material-carrier L, the plate O, rotating on said carrier and longitudinally adjustable thereon, and the holder M, longitudinally adjustable on said plate O, in combination with automatic shifting mechanism for turning said plate O, substantially as set forth.

27. The combination of the material-carrier, the adjustable plate P, adjustable thereon, adjustable holder M, adjustable with reference to said plate, and adjustable housing 231, adjustable on said holder, substantially as set forth.

28. The material-carrier L, and the adjustable plate P, longitudinally adjustable on said carrier, in combination with the rotary plate O, turning within the plate P, and partaking of the longitudinal adjustment thereof, and the holder M, carried by said plate O, substantially as set forth.

29. The rotary rack and its casing, in combination with the two-part material carrier and holder, and means for coupling said holder to said rack, substantially as set forth.

30. The rotary rack having recesses $a$, and the rack-casing having abutment, quadrantal slot, releasing and restoring cams, in combination with the material-carrier, the holder turnable thereupon, said holder having trip $f$, adapted to said abutment, and stud $b$, adapted to said recesses, slot, and cams, substantially as set forth.

31. The combination of the rack, means for driving the same, the material-carrier, the material-holder, housing 231, on said holder, plunger 32, therein, having three pins 44, 45, 47, spring for said plunger, stud $b$, pivoted to said plunger, pivoted slotted lever 38, connected with said stud, spring therefor, latch-lever 40, spring therefor, notched trip-slide, spring therefor, trip pivoted to said slide, spring therefor, lock-lever, and spring therefor, substantially as set forth.

In testimony that I claim the invention above set forth I affix my signature in presence of two witnesses.

JOHN Q. A. HOUGHTON.

Witnesses:
ARTHUR S. BROWNE,
G. FRANK GIBNEY.